United States Patent [19]
Mastik

[11] 3,860,408
[45] Jan. 14, 1975

[54] GLASS ROD SLUG MOLDING MACHINE
[75] Inventor: Emil A. Mastik, Guttenberg, N.J.
[73] Assignee: Kahle Engineering Co., Union City, N.J.
[22] Filed: Dec. 12, 1973
[21] Appl. No.: 424,054

[52] U.S. Cl............................ 65/174, 65/72, 65/102, 65/105, 65/122, 65/177, 65/181, 65/244, 65/269, 65/304, 65/305, 65/324, 65/334
[51] Int. Cl............................................. C03b 9/46
[58] Field of Search ....... 65/105, 72, 102, 122, 324, 65/269, 62, 63, 334, 305, 244, 181, 177, 174, 304

[56] References Cited
UNITED STATES PATENTS

| | | | |
|---|---|---|---|
| 1,262,567 | 4/1918 | Rippl .............................. | 65/174 X |
| 1,546,353 | 7/1925 | Rippl et al. ........................... | 65/174 |
| 2,366,609 | 1/1945 | Gates................................... | 65/244 |
| 2,582,818 | 1/1952 | Coby................................... | 65/105 |
| 2,596,899 | 5/1952 | Kahle................................ | 65/174 X |
| 2,878,620 | 3/1959 | Calehuff et al. .................. | 65/174 X |

Primary Examiner—Robert L. Lindsay, Jr.
Assistant Examiner—Frank W. Miga
Attorney, Agent, or Firm—Holland, Armstrong, Wilkie & Previto

[57] ABSTRACT

An automatic machine is disclosed for molding small glass articles, such as lenses, jewels, buttons, etc. The glass is supplied to the machine in the form of elongated solid glass rods. A number of these rods are fed downwardly to cutting shears. The lower ends of the rods are heated and they are severed in turn and fed to molds on a molding dial. The molding dial supports a number of spaced molds and after a glass slug is fed into each of the molds, the molding dial carries each charged mold successively to a molding station and a plurality of heat treating and cooling stations, and finally to a discharge station.

8 Claims, 21 Drawing Figures

GLASS ROD SLUG MOLDING MACHINE

BACKGROUND OF THE INVENTION

The present invention relates to a method and means for automatically producing small pressed or molded glass articles and more particularly for producing such articles from elongated glass rods including rods formed of heat resistant glass formulations.

There are a number of small transparent articles which require a high degree of resistance to injury by high temperatures or which must be able to tolerate extreme temperature variations. These articles may be advantageously formed of special glass formulations most conveniently supplied as elongated glass canes or rods. Where the glass material is of a heat resistant nature, it has previously been found difficult to prepare the relatively small molten glass charges which must be fed to the article forming molds. The improved method and means of this invention permit the glass to be supplied to a molding machine in the form of rods and provide for an efficient and high speed mold charging and pressing operation using the rods for the glass supply.

Accordingly, an object of the invention is to provide an improved method and means for pressing or molding small glass articles.

Another object of the invention is to provide an improved method and means for molding small glass articles from glass including heat resistant glass supplied as elongated canes or rods.

Another object of the invention is to provide an improved method and means of molding glass lenses or jewels or similar articles from a glass which is resistant to injury by high temperatures or by great temperature variations.

Another object of the invention is to provide an improved method and means for molding small glass articles having a variety of differing shapes.

Another object of the invention is to provide an improved method and means of molding glass articles using a plurality of glass rods for feeding a single mold charging position.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein.

DESCRIPTION OF THE PREFERRED EMBODIMENT

Figure 1:
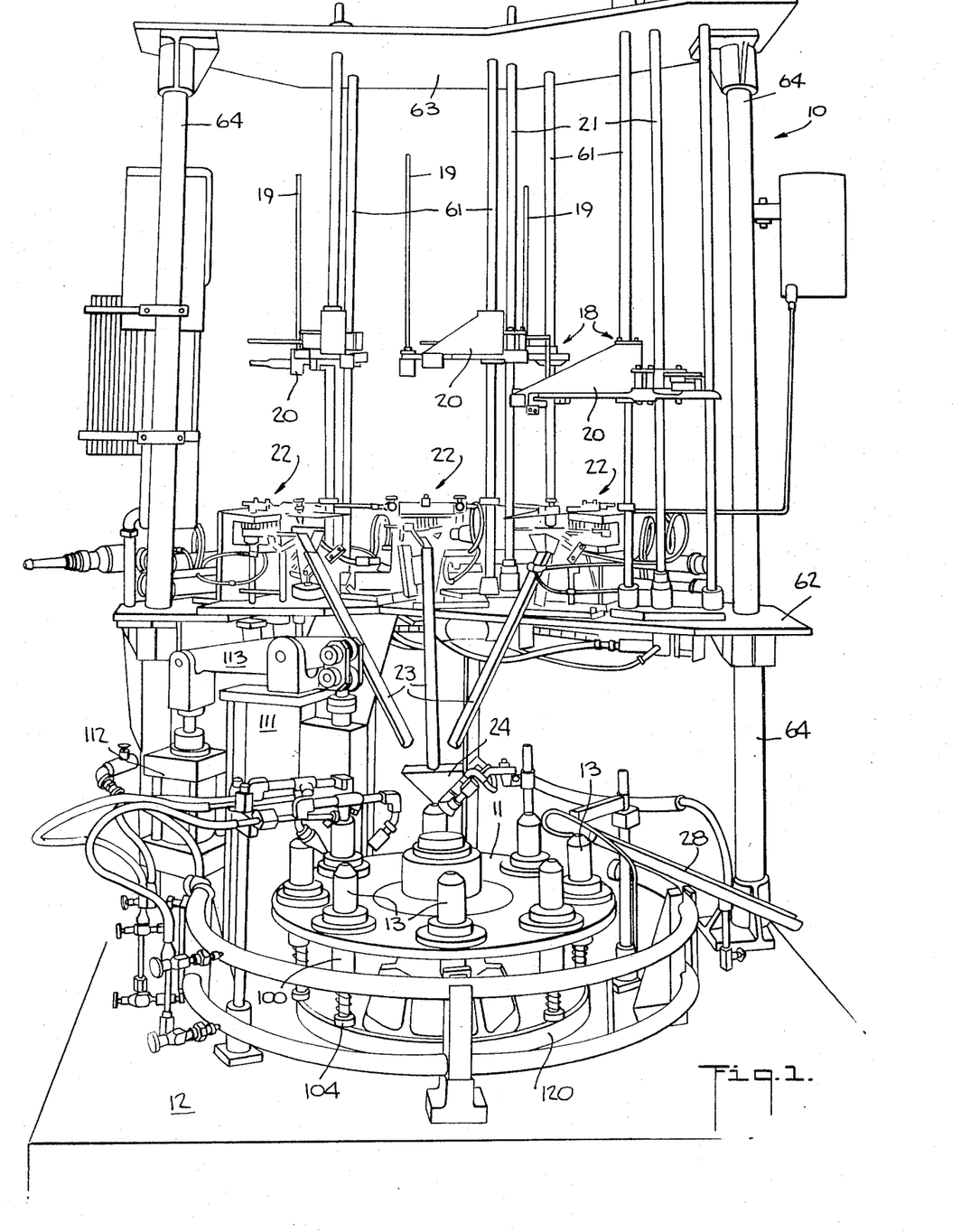
FIG. 1 is a perspective view of a preferred embodiment of the molding means of the invention.
Figure 2:
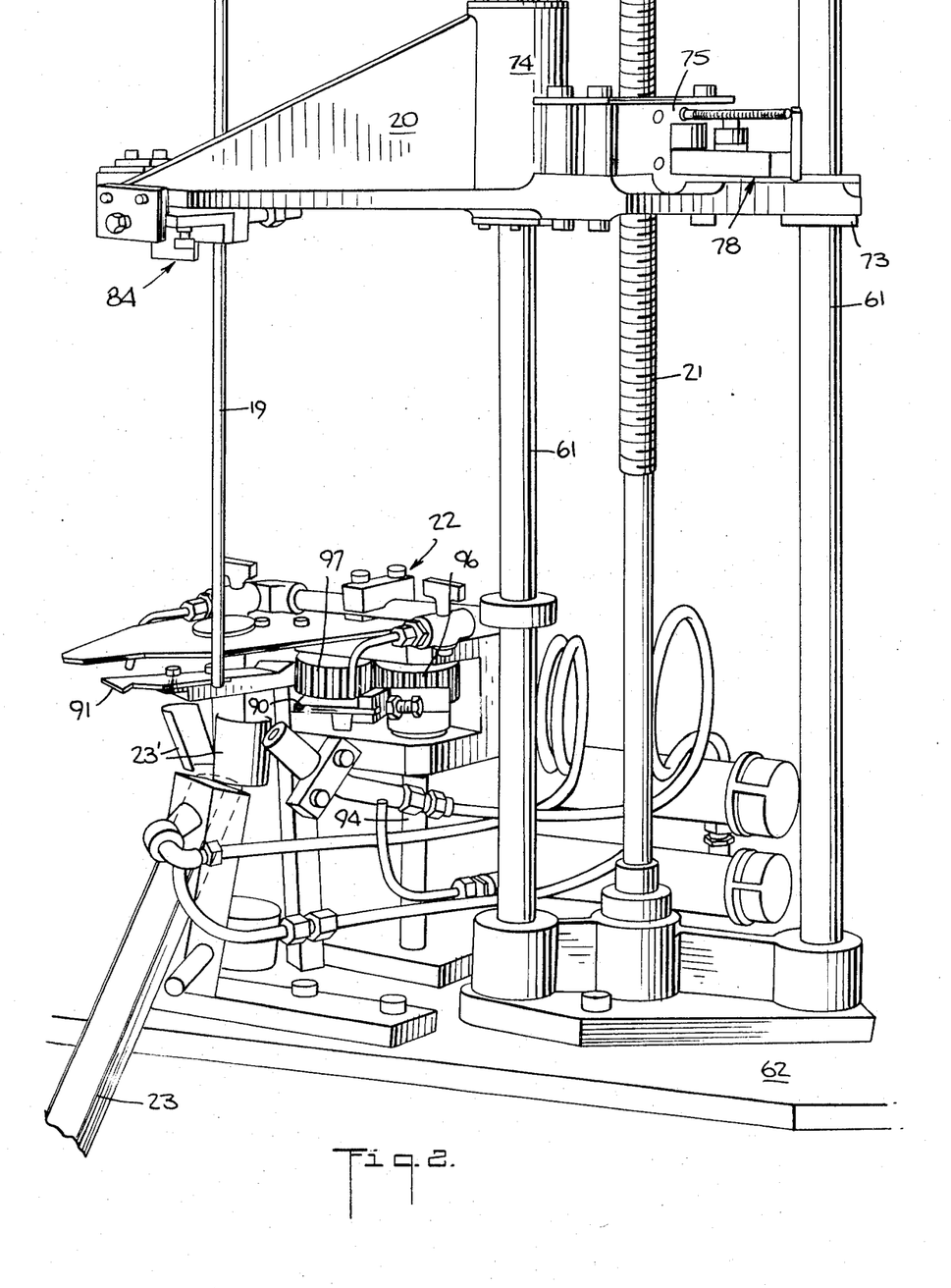
FIG. 2 is an enlarged perspective view of a glass rod support arm and of a cutting head.

The method and apparatus of the invention will first be generally described with principal reference to FIG. 1 and certain other figures as indicated.

The pressing or molding apparatus 10 of the present invention includes a dial 11 rotatably mounted on a suitable base 12 and supporting a number of identical spaced mold supports 13 at the periphery of a dial 11. The dial 11 is shown at the bottom of FIG. 1 rotatably mounted upon the base 12 which houses the dial drive and timing mechanisms. Each of the mold supports 13 mounts a lower mold 15 (FIG. 14) having an upwardly facing cavity 16 into which a molten glass charge 17 (FIG. 16) is fed from a charge mechanism 18 mounted above the dial 11.

The glass charges 17 for the molds 15 are supplied to the apparatus initially in the form of elongated glass rods 19. Each of the rods 19 are mounted on a rod support arm 20. The arms 20 feed the rods 19 downwardly through the intermediation of rotating feed screws 21 driven in synchronism with the dial drive. A cutter head 22 is mounted beneath each of the rod support arms 20 in position to periodically cut the lower heated ends from the rods 19. This cut portion or charge 17 passes down a feed chute 23 and through a funnel 24 into one of the mold supports 13 properly positioned by the rotating mold support dial 11 at a Glass Loading Station 1.

As the mold support dial steps 11 around, each of the charged molds 15 is first presented to a Molding Station 2, which includes an upper mold 26 (FIG. 14) and then to a number of Heat Treating and Cooling Stations 3–6. The molded and properly heat treated glass article 27 is removed from the mold support 13 at a Discharge Station 7 at an unloading chute 28.

In order to provide for a high speed machine operation and to operate the Loading Station 1 at the same rate with the Molding Station 2 operation, several identical rod feed screws 21 and cutter heads 22 are used which are operated successively in feeding the molds 15. In particular, this permits the use of glass formulations having a high melting point as the duplicate rod feeding assemblies permit a longer heating cycle for the lower ends of the rods 19 prior to the charge cutting operation.

As will be more fully described below, the mold supports 13 mount the lower molds 15. This arrangement together with the use of a replaceable upper mold 26 at the Molding Station 2 permits the machine 10 to be adapted for producing a variety of differing molded glass articles. The above described multiple glass rod feed permits these articles to be formed of differing glass compositions, including those being formed from heat resistant formulations having differing melting temperatures including relatively high melting temperatures.

THE MOLD SUPPORTING DIAL AND ITS DRIVE MECHANISM

Figure 3:
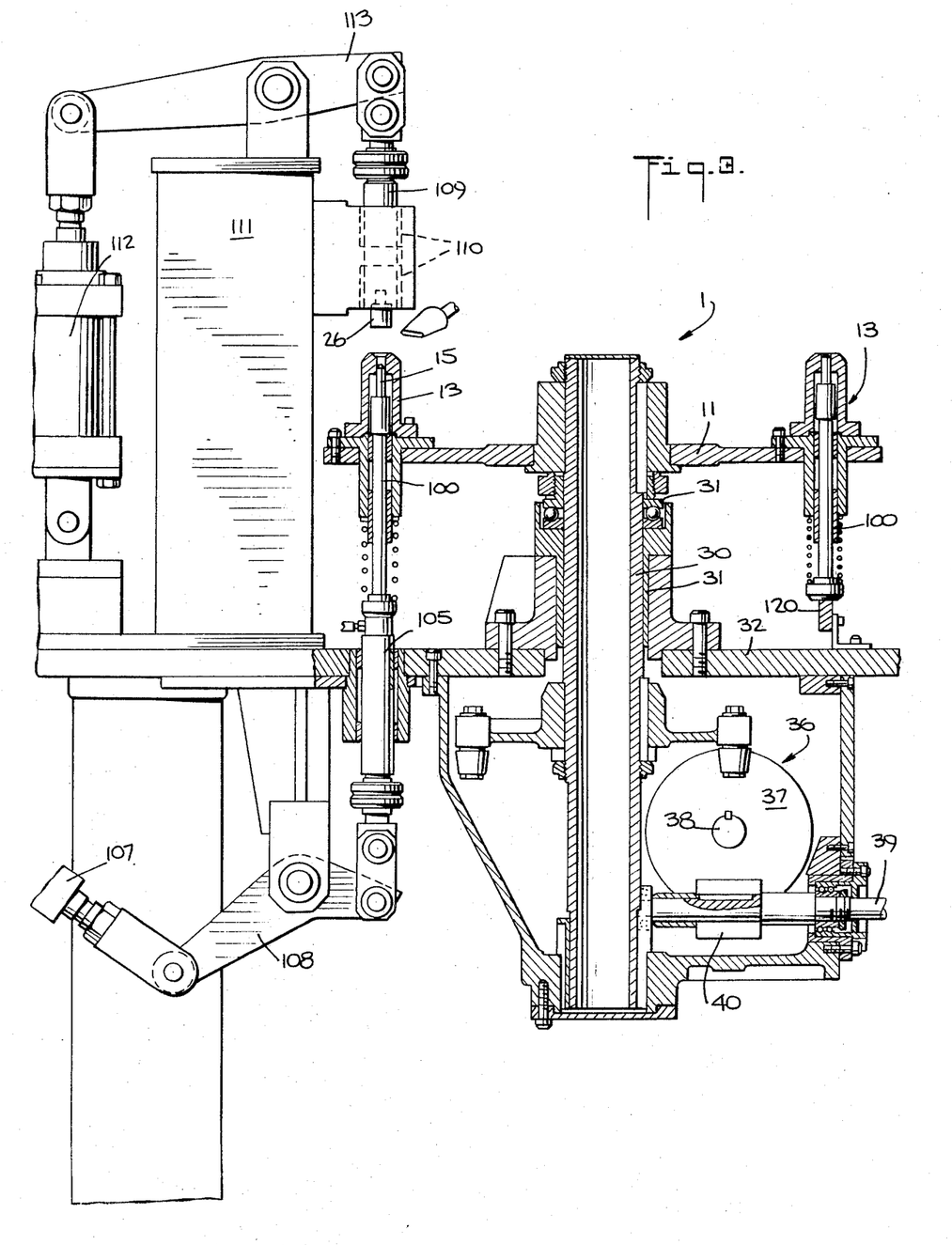
FIG. 3 is a vertical sectional view of the mold support dial and the molding station.
Figure 5:
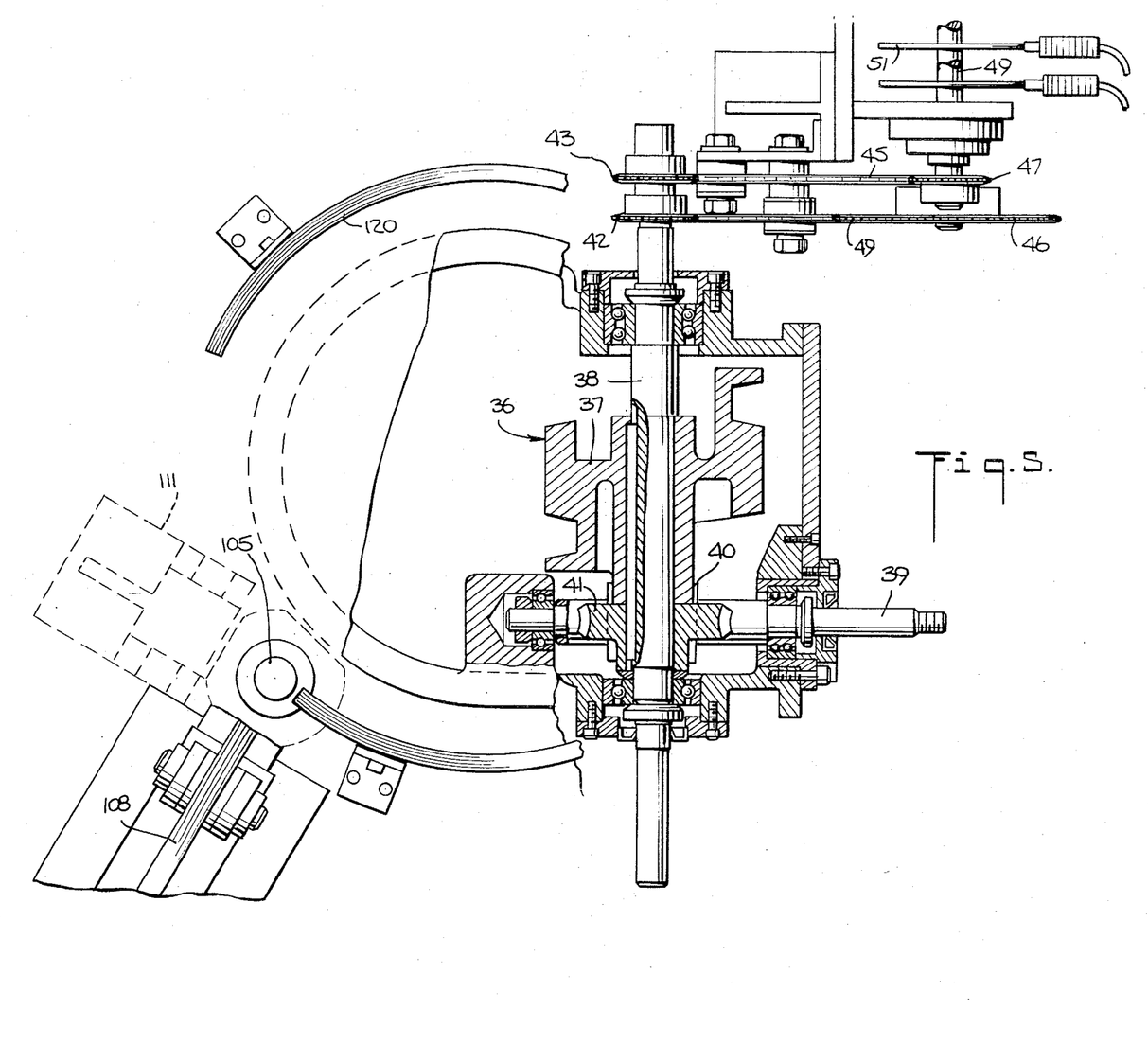
FIG. 5 is a horizontal sectional view illustrating the mold support dial drive and the mold positioning cam.

The molding of the individual glass articles, as already noted in the general description above, is done in a number of similar molds where the lower mold portions 15 are mounted in a number of similar mold supports 13 mounted on the support dial 11. A dial 11 mounting eight similar mold supports 13 is illustrated in FIG. 1 in position beneath the glass rod 19 charging mechanism 18. FIGS. 3 and 5 illustrate the preferred mounting for the dial 11 and its drive system. The dial 11 is rotatably mounted on a central vertical shaft 30 supported in suitable bearings 31 on a cover plate 32 of the base 12. The circular dial 11 is attached to the upper end of the shaft 30 for movement therewith and the mold supports 13 including an upper body portion 33 and a lower body portion 34 are mounted in holes 35 at the periphery of the dial 11.

In order to successively step the mold supports 13 to each of the eight stations, an intermittent drive such as the barrel cam index drive illustrated at 36 in FIG. 3 is used. The cam 37 on shaft 38 is driven from an electric drive motor system through the intermittence of a drive shaft 39 and worm 40 and worm gear 41. Continuous rotation of the drive shaft 38 by the electric drive system provides for an intermittent or stepped advance of the dial 11 as it carries the mold supports 13 from station to station. As illustrated in FIG. 5, sprockets 42 and 43 on shaft 38 and chains 44 and 45 drive sprockets 46 and 47 on shafts 48 and 49 to drive a number of timing cams including cams 50 and 51 for actuating the glass cutter heads 22 and other related mechanisms further described below in synchronism with the movement of the dial 11. Where three rod 19 support systems are used, the cam shaft 48 would make one revolution for three steps of the dial 11 for controlling the cutting heads while the second cam shaft 49 revolves once for each step to control the molding and related operations.

THE GLASS CHARGE FEEDING SYSTEM

Figures 19, 20:
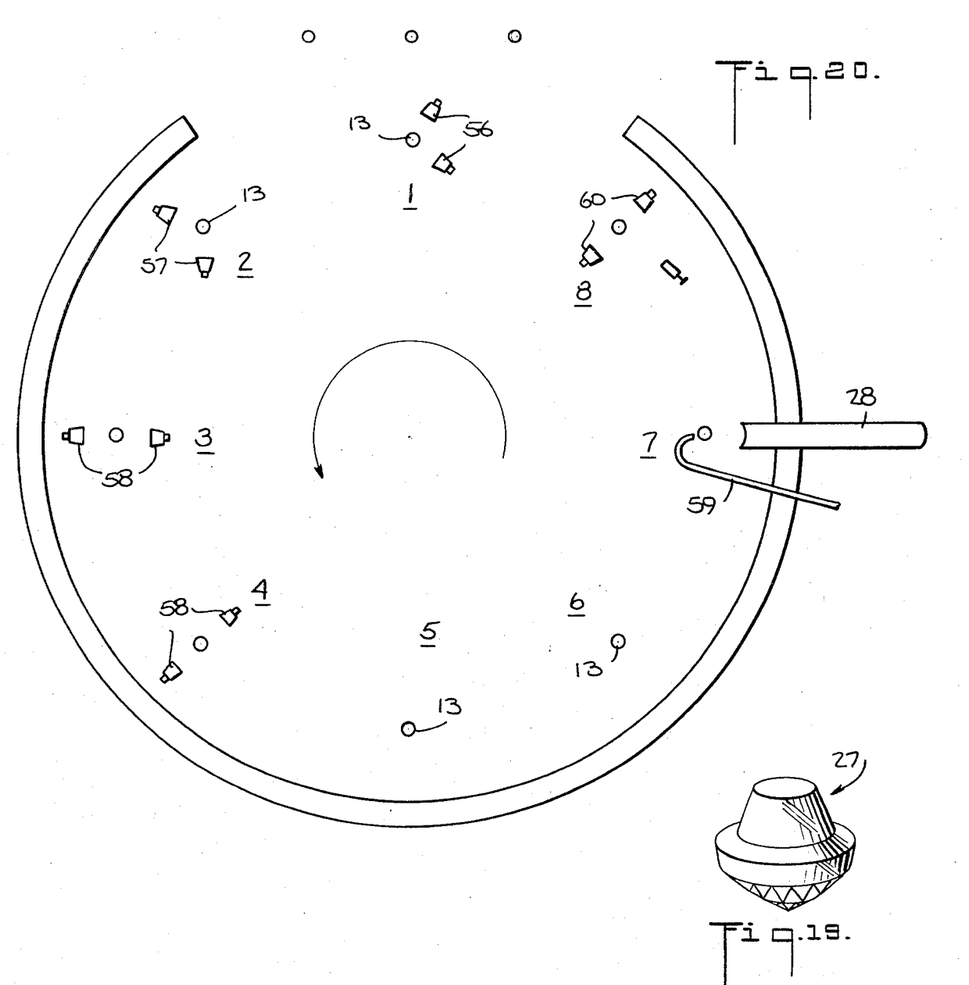
FIG. 19 is a perspective view of a typical glass jewel molded by the method and apparatus of the invention.
FIG. 20 is a diagrammatic plan view illustrating the stations at the mold support dial.

As already indicated, a number of similar charge feeding systems 18 are employed so that the apparatus may be run near the maximum speed obtainable at the Molding Station 2. FIG. 20 illustrates diagrammatically the eight stations to which each of the eight molding supports 13 is successively carried by the dial 11.

Station 1 is the Mold Charging station at which a gob 17 of molten glass which has been cut from one of the glass rods 19 is fed into the lower mold portion 15 in a mold support 13. Flame nozzles 56 heat the mold support 13.

Station 2 is the Molding Station, which will be described in detail below, where the upper and lower mold portions 15 and 26 are moved together by the upper and lower molding presses 54 and 55 (FIG. 3) to shape the glass article 27. Flame nozzles 57 heat the mold support 13.

At Stations 3–6 the molded articles 27 are permitted to cool so that the articles 27 reach a form retaining state. During the initial cooling at Stations 3 and 4 heat is applied by nozzles 58 to provide for a controlled cooling from the high molding temperatures.

Station 7 is the discharge station where the molded articles 27 are removed from the machine 10 by a combination of the action of an air nozzle 59 and the discharge chute 28.

Station 8 is a Mold Heating Station where flame nozzles 60 bring the lower mold portion 15 up to an elevated temperature preparatory to the loading of the molten glass charge 17 at the Mold Charging Station 1.

Figures 4, 16, 17:
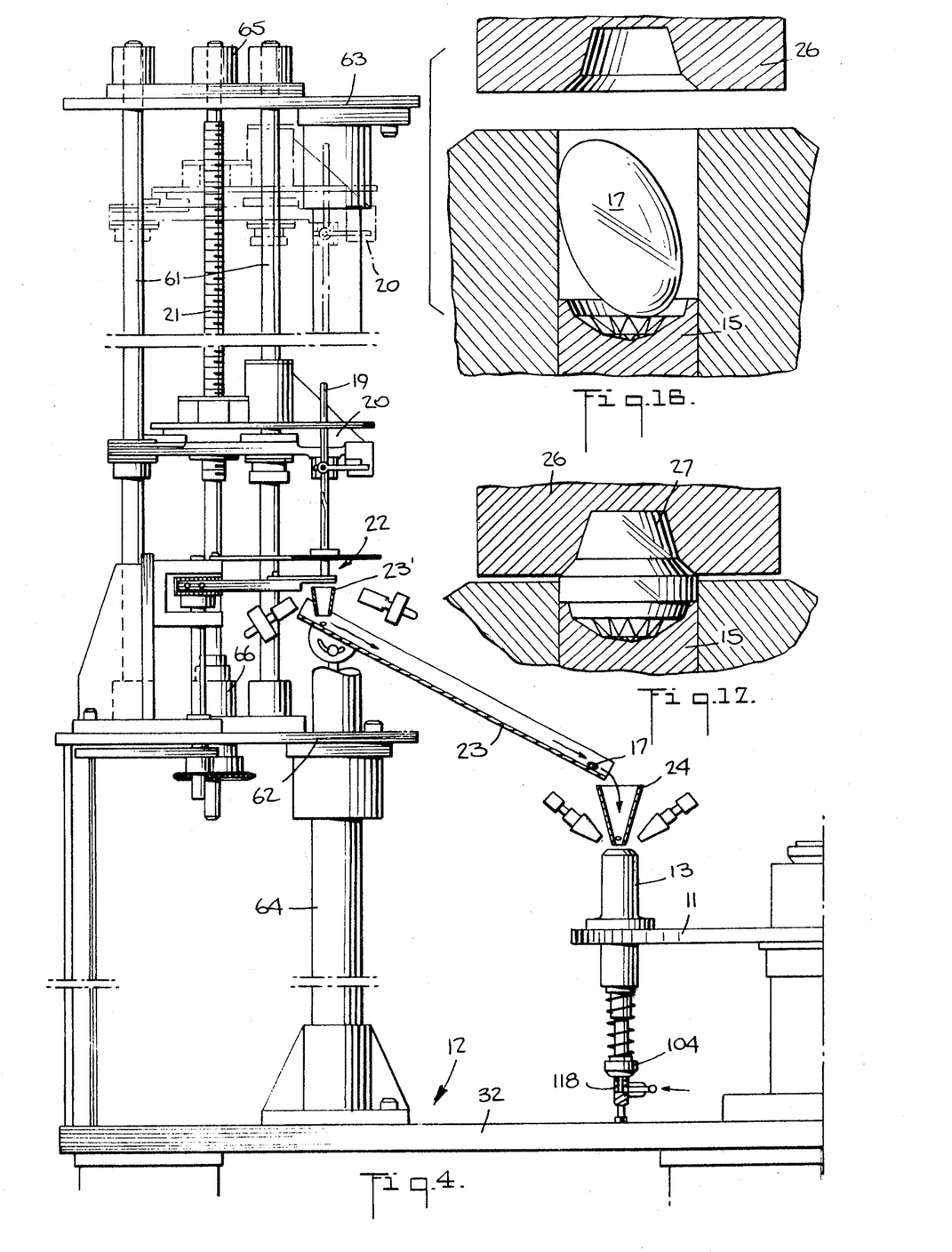
FIG. 4 is a fragmentary side elevational view partially in section illustrating the rod feeding and cutting means and the mold support loading means.
FIGS. 16 and 17 (on sheet 4) are enlarged vertical sectional views illustrating successive steps in the mold charging and pressing operations at Stations 1 and 2.

FIG. 1 illustrates three identical charge feeding means including glass rod support arms 20. The support arms 20 are slidably mounted on spaced guide rods 61 extending between a cutter head support plate 62 and an upper support plate 63 mounted on spaced support posts 64. Each of the glass rod support arms 20 is continuously lowered at a predetermined feed rate under the control of a vertical lead screw 21 mounted on suitable bearings 65 and 66 on the upper and lower support plates 62 and 63 (FIG. 4). During the operation of the machine, each of the lead screws 21 is turned at a predetermined speed to lower the glass rods 19 a sufficient distance between cutting operations so that the lower portion of each rod 19 which is cut off from the rod, has a predetermined volume.

Figures 6, 7:
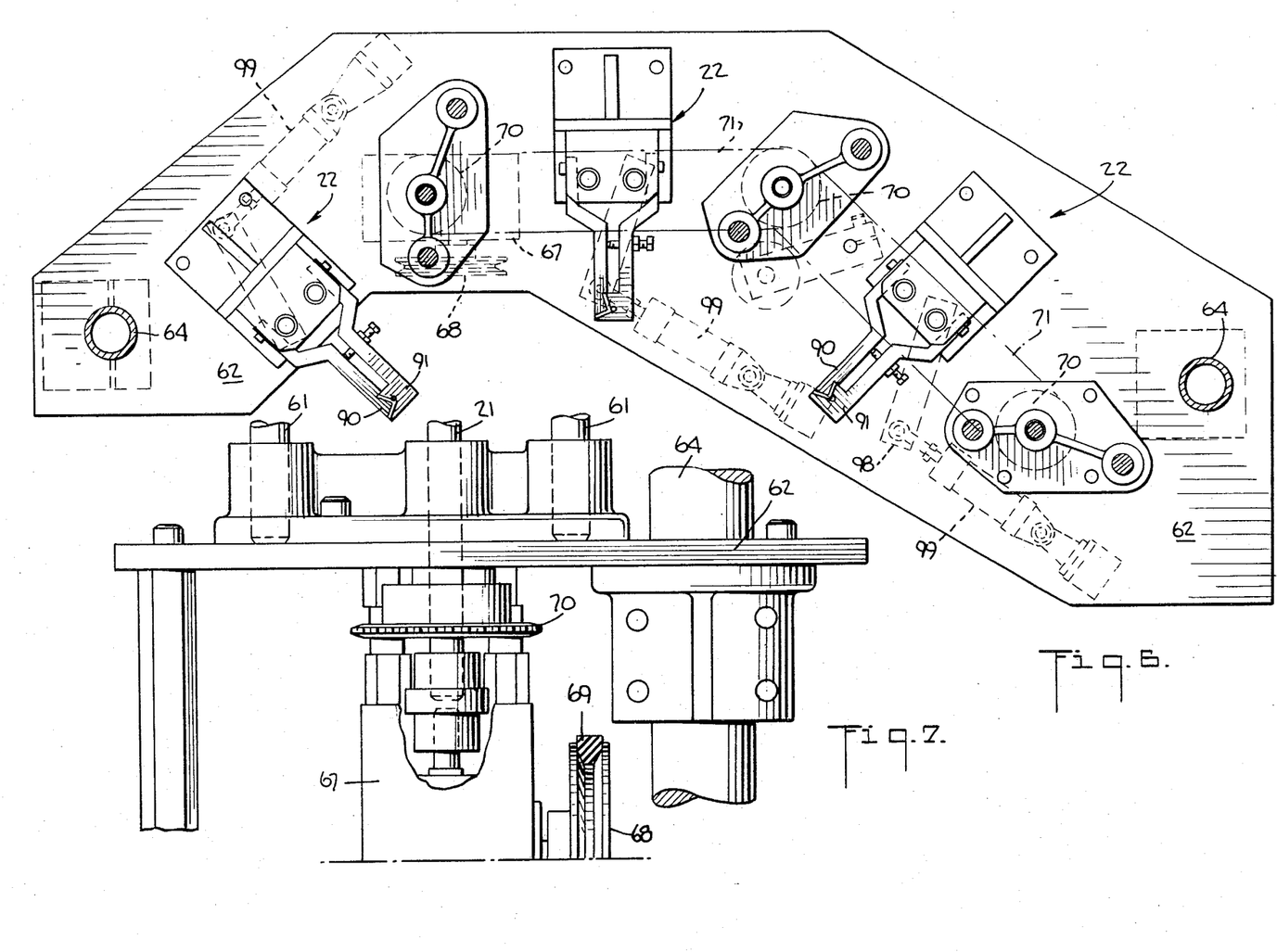
FIG. 6 is an enlarged top plan view of the glass rod cutter heads.
FIG. 7 is a fragmentary side elevational view partially cut away illustrating the feed screw drive system.

The drive system for the lead screws 21 is best illustrated in FIGS. 6 and 7. The left-hand lead screw 21 as seen in FIG. 6, is coupled to a right angle speed reducer 67. The drive pulley 68 for the speed reducer 67 is coupled by a drive belt 69 to an adjustable speed electric drive motor mounted on the base 12 (not shown). The second and third lead screws 21 are coupled through the intermittence of sprockets 70 and chains 71 to the lead screw 21 driven from the speed reducer 67 so that all lead screws 21 rotate at the same speed to lower the support arms 20 at the same predetermined feed rate.

Figures 8, 10:
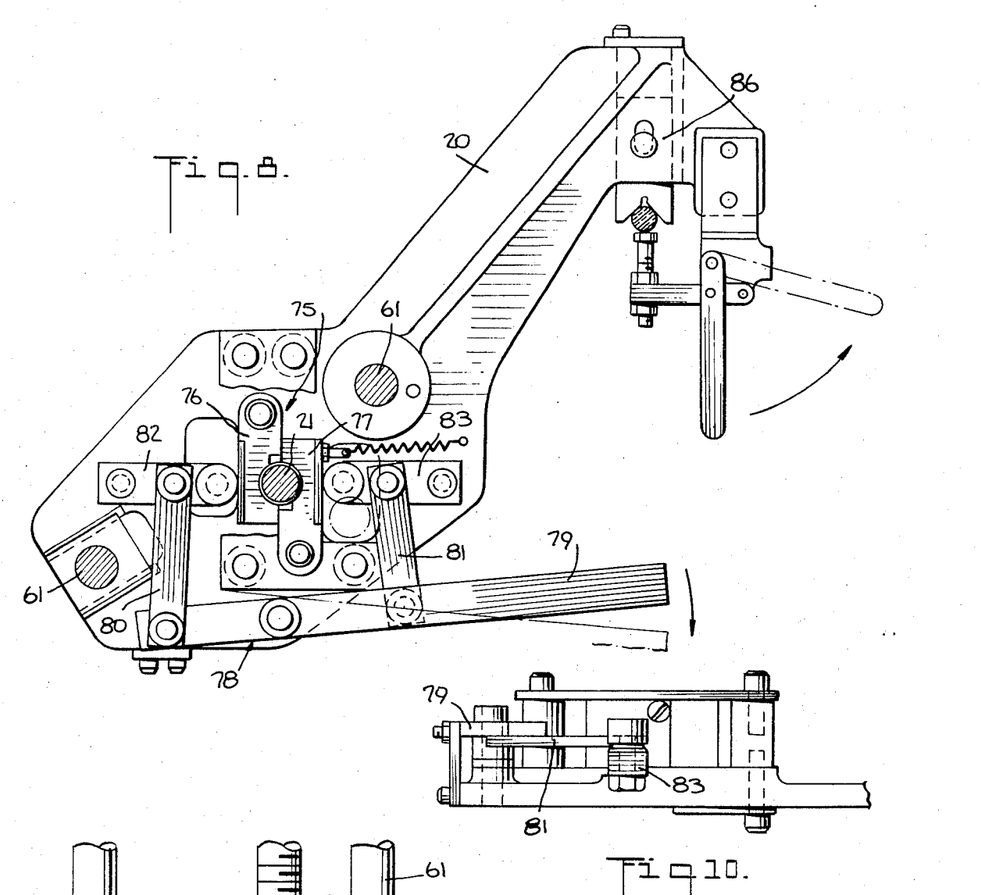
FIG. 8 is an enlarged detailed top plan view of a glass rod feeder support arm.
FIG. 10 is a front elevational view of the glass feeder support arm of FIGS. 8 and 9.
Figure 9:
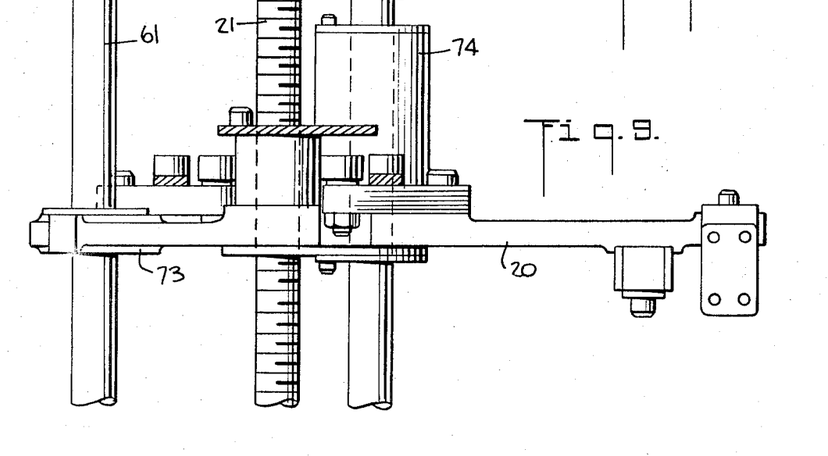
FIG. 9 is a side elevational view of the feeder support arm of FIG. 8.

FIGS. 8, 9 and 10 illustrate a preferred embodiment of the support arms. Bearings 73 and 74 are provided on each arm 20 for slidably engaging the spaced guide rods 61. Each of the arms 20 is detachably connected to a lead screw 21 by a split nut 75. The two sections 76 and 77 of the nut 75 are pivotally attached to a toggle mechanism 78. When the toggle arm 79 is swung to the position illustrated in dash and dot lines in FIG. 8, the pivoted links 80–83 swing the split nut 75 open permitting the rod support arm 20 to be raised by the operator to its upper loading position. A toggle clamp 84 including adjustable gripping members 85 and 86 is mounted on the opposite end of each support arm 20 for releasably engaging the glass rods 19. After each of the support arms 20 has been raised to its uppermost position, a new elongated glass rod 19 is clamped into position between the gripping members 85 and 86 operated by a toggle arm 87 which is operatively coupled to the gripping member 85 by a pivotally attached toggle link 88.

THE CUTTER HEADS

A cutter head 22 is positioned on the lower support plate 62 adjacent to the lower end of each of the three glass rods 19. These cutter heads 22 are activated by a timing cam in the cam system so that only one of the three cutters slices the lower end off of a glass rod when an empty lower mold has been presented by the dial to the Mold Charging Station 1.

Figure 11:
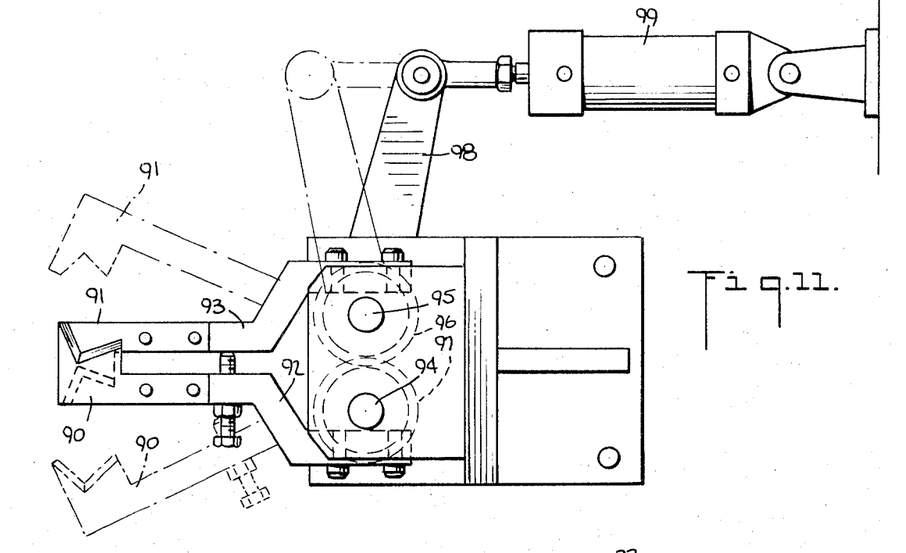
FIG. 11 is an enlarged detailed plan view of a glass rod cutter head.
Figures 12, 13:
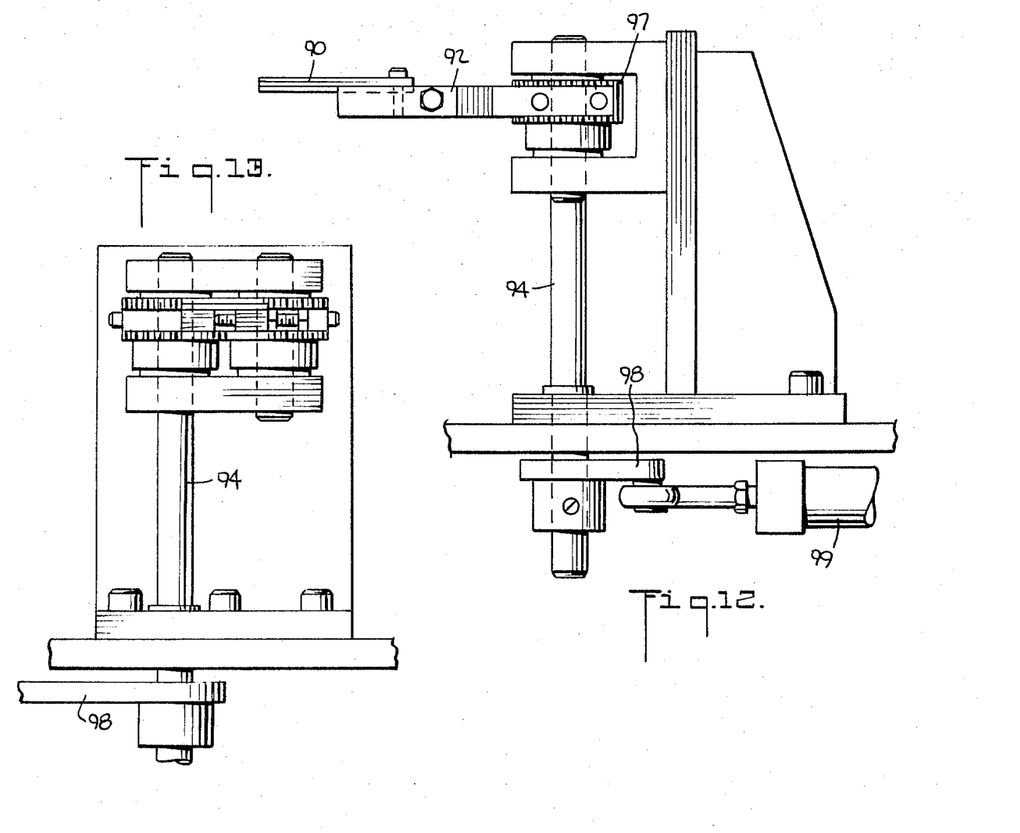
FIG. 12 is a side elevational view of the cutter head of FIG. 11.
FIG. 13 is a front elevational view of the cutter head of FIG. 11.

FIGS. 11, 12 and 13 illustrate a preferred embodiment of the cutter heads 22 whose relative positions on the lower support plate 62 are illustrated in FIG. 6. Each of the cutter heads 22 includes a pair of cutter blades 90 and 91 mounted on shear arms 92 and 93. The arms 92 and 93 are attached to vertical shafts 94 and 95 by being bolted to the outer edges of a pair of pinions 96 and 97. One of these pinions 96 and 97 is mounted on each of the vertical shafts 94 and 95 with the gears 96 and 97 being engaged with one another to simultaneously move the cutter blades 90 and 91 to and from their cutting position when the shaft 94 is turned through the intermediation of a crank 98 and a cam actuated air cylinder 99.

FIG. 4 shows the severed lower end of the glass rod dropping from the cutter head 22 as a charge 17 through a funnel 23' and a chute 23. The lower end of the chute 23 directs the molten glass charge 17 into a second funnel 24 which guides the glass charge 17 into the lower mold section 15 in the manner illustrated in FIG. 16.

THE MOLDING STATION

The operation of the upper and lower mold sections 26 and 15 together with the related portions of the eight mold supports 13 will now be described with particular reference to FIGS. 3 and 14 through 18.

The molding apparatus and operation will be described in connection with the manufacture of a transparent glass jewel such as might be used in a pilot light and of the form illustrated in FIG. 19.

Figures 14, 15, 18:
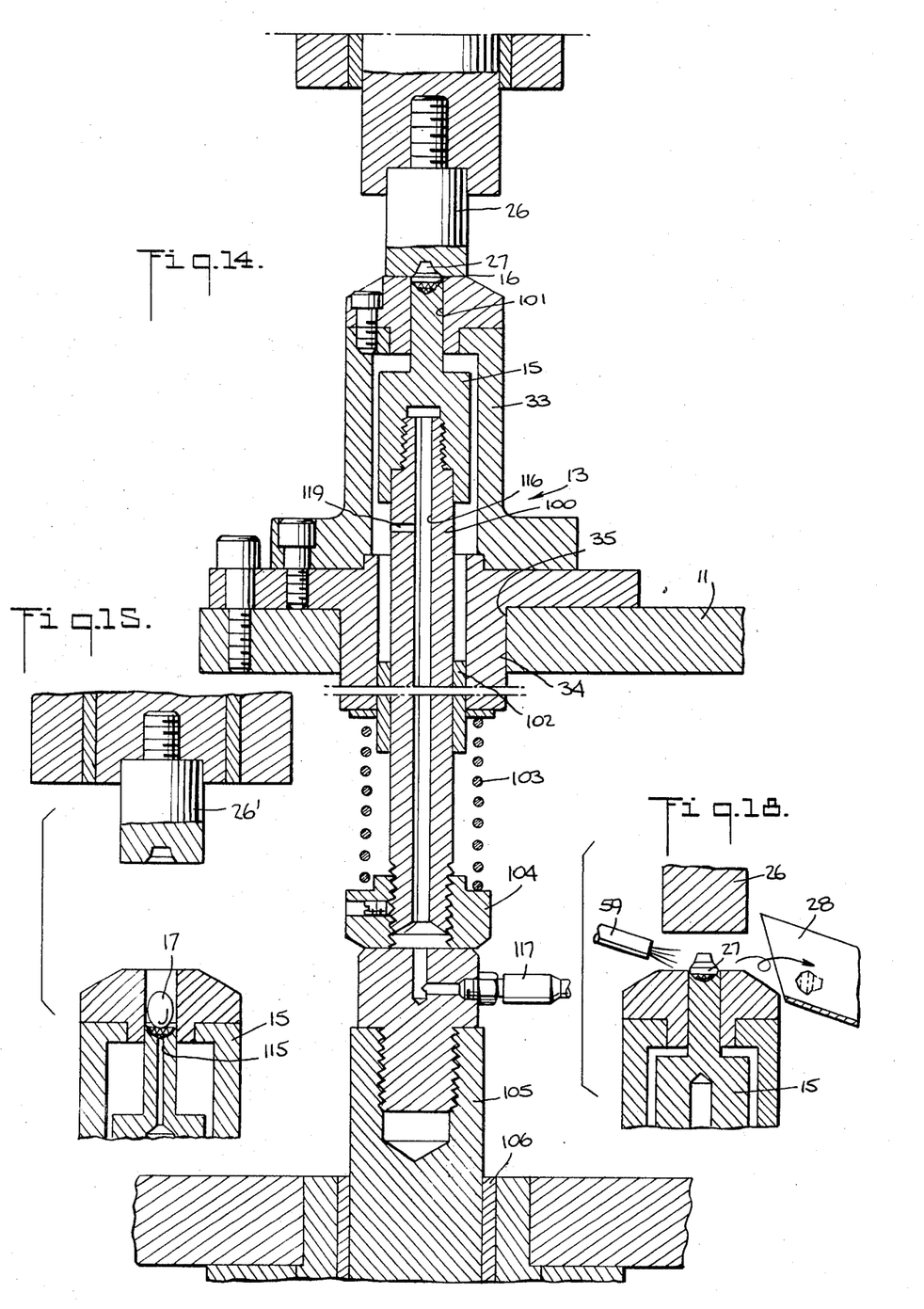
FIG. 14 is a vertical sectional view illustrating a mold holder at the molding station with the upper and lower molding presses in their molding positions at Molding Station No. 2.
FIG. 15 is a detailed vertical sectional view of the upper and lower molding heads in their open position at the Glass Charge Loading Station No. 1.
FIG. 18 (on sheet 9) is an enlarged vertical sectional view of a mold support at the Discharge Station No. 7.

After a glass charge 17 of the proper volume has been cut from the lower end of one of the glass rods 19 and has been dropped into a lower mold section 15 as illustrated in FIG. 16, the mold support 13 which mounts this lower mold section 15 is stepped to the Molding Station 2 where the pressing or molding operation is performed. FIG. 14 illustrates a mold support 13 in Molding Station 2 during the molding operation. The lower mold section 15 is threadedly attached to the top of a lift rod 100 with the lower mold section 15 being slidably contained within an aperture 101 in the mold support 13. The lift rod 100 is mounted for vertical movement by bearing 102 and is urged towards a lowered charge receiving position, corresponding to FIG. 16, by a compressed coil spring 103. A cam follower shoe 104 is threadedly connected to the lower end of the lift rod 100. At the Molding Station 2, the lower molding press 55 includes a plunger 105 which is slidably mounted in suitable bearings 106 on the top 32 of base 12. It is raised to move the lower mold section 15 to its molding position, as seen in FIG. 17, through the intermediation of an air drive cylinder 107 and a connecting crank 108 (FIG. 3). The air drive motor 107 is activated under the control of a suitable cam such as the cams 50 of the cam timing system.

While the lower mold section 15 is being raised and held upwardly at the molding position, the upper section 26 of the mold is moved downwardly with sufficient molding force on a slidable plunger 109 mounted in bearings 110 on a support bracket 111. The molding force is applied to the plunger 109 through the intermediation of an air cylinder 112 coupled to the plunger 109 by a crank 113. The cylinder 112 is also operated under the control of one of the cams 50 in the cam timing system. During this molding operation, the glass charge 17 is kept molten and the mold sections 15 and 26 are heated by the heating nozzles 57.

FIG. 15 illustrates upper and lower mold sections 26' and 15' which have a differing cavity such as would be used to mold glass balls. The lower die section 15' includes a channel 115 which communicates through a channel 116 in the lift rod 100 with a source of air pressure 117. This air pressure is applied at the molding station to keep the glass charge 17 from flowing into channel 116.

The channel 115 is employed at the Mold Charging Station 1 to apply a vacuum force to the charge 17 to pull it into the mold section 15'. The vacuum force is coupled to channel 115 through channel 116 and a vacuum port 118 positioned to engage cam shoe 104 (FIG. 4).

In the embodiment of the lower mold section illustrated at 15 in FIG. 14 and not including a channel 115, vacuum is applied at the mold section cavity 16 at the Mold Charging Station 1 through port 118, channels 116 and 119 and through the clearance between the lower mold section 15 and aperture 101.

Figure 21:
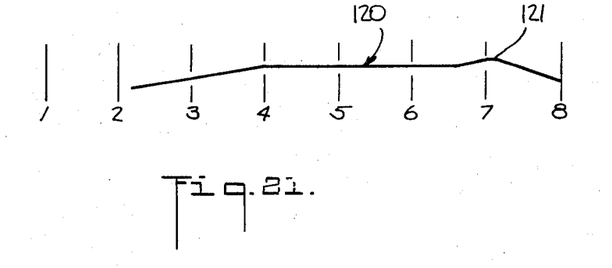
FIG. 21 is a diagrammatic illustration of the lower press supporting cam profile.

A semi-circular cam engages and supports the lift rods 100 at all stations except at the Mold Loading Station 1 and the Molding Station 2. The cam is illustrated at 120 in FIGS. 1 and 20 and the cam profile is shown diagrammatically in FIG. 21. The cam 120 engages each cam shoe 104 on the lift rod 100 and raises the molded and shaped glass articles, such as the jewels 27, partially towards the top of the mold supports 13 at Station 3 and slightly higher at Station 4 as the heater nozzles 56 at these positions continue to supply heat to the molded articles for a controlled temperature drop in the mold articles. The surface of cam 120 remains level at Stations 5 and 6 holding the completed articles near the tops of the mold supports 13 to facilitate a continuing cooling action of the molded articles at these two stations.

At Discharge Station 7, the cam 120 has a raised portion 121 which lifts the lower mold section 15 to the position shown in FIG. 18 thereby exposing the molded articles to a blast of air from the air nozzle 59 so that the articles 27 are discharged down the discharge chute 28.

An air inlet (FIG. 21) is provided at the Discharge Station 7 which supplies air under pressure through channels 116 and 115 or 119 to help discharge the molded articles for assisting the action of air nozzle 59.

It will be seen that an improved method and apparatus have been provided for forming small glass articles, such as lenses, etc. The method and apparatus are particularly adapted for forming such articles of glass formulations which resist high temperatures and which are immune to rapid temperature changes. This result is obtained by providing several identical glass charge supply means for alternatively loading the molds using glass rods whereby sufficient heating of the glass supply rods may be obtained without reducing the overall machine speed.

This feature adapts the machine for use with differing glass formulations having differing properties and eliminates the need for a separate glass melting or charging furnace. The sources of impurities characteristic of furnaces are thereby eliminated.

In addition, the use of replaceable mold sections permits an interchangeability of mold parts which makes the method and apparatus useful for forming a variety of articles of differing shapes.

The improved apparatus has a rugged and relatively simple design which is capable of high speed continuous operation with a minimum amount of maintenance. The apparatus and method therefore permit the economical manufacture of high quality translucent articles of glass so that advantage can be taken of the desirable characteristics of glass in a number of uses where a less desirable plastic material has been heretofore used.

The use of several differing rods for the glass supply permits the glass to be of differing colors to provide an output of glass jewels or other articles of assorted colors.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved means for molding small glass articles from glass rods comprising the combination of:
   a rotatably mounted mold support disc;
   a plurality of mold supports mounted in spaced relation around the periphery of said disc;
   a glass loading station positioned at said disc;
   a molding station positioned at said disc;
   drive means for said disc for stepping said mold supports successively to said loading and molding stations;
   a plurality of glass charge supplying means each including a glass rod feeder positioned adjacent to said loading station;
   means for heating the lower ends of each glass rod;
   means for cutting molten glass charges from the heated lower ends of the rods and for directing the charges to the loading station;
   said mold supports each mounting a lower mold section;
   actuating means including timing means coupled to said disc drive means and to said rod cutting means for operating the cutting means for one rod feeder only for each stepped advance of the disc and for cutting the rods in succession whereby charges from successive rods are fed to successive lower mold sections;
   an upper mold section positioned at the molding station; and
   mold drive means positioned at said molding station for providing relative motion for said upper and lower mold sections for moving them together to mold said articles.

2. The molding means as claimed in claim 1 in which said mold drive means comprises drive cylinders and connecting cranks.

3. The molding means as claimed in claim 1 which further comprises means at said molding station for supplying air under pressure to said lower mold sections.

4. The molding means as claimed in claim 1 in which said glass rod feeders comprise a feed screw for each charge supplying means, and drive means operatively coupling said feed screws together and to a drive motor for synchronized rotation.

5. The molding means as claimed in claim 1 in which said rod feeders each comprise a support arm with means for detachably engaging the glass rods, and having a split nut releasably engaging the feed screws.

6. The molding machine as claimed in claim 1 in which said cutter means comprises cutter blades positioned for severing a lower portion from each of said glass rods.

7. The molding means as claimed in claim 1 in which;
   said lower mold sections and said upper mold section are movably mounted for movement towards and away from one another; and
   said mold drive means is operatively coupled to both said upper and lower mold sections for moving both the upper and lower sections during the molding operation.

8. The molding means as claimed in claim 1 in which said mold sections are removably mounted for replacement.

* * * * *